(12) United States Patent
Matta et al.

(10) Patent No.: US 12,344,338 B2
(45) Date of Patent: Jul. 1, 2025

(54) DRIVER-ASSISTANCE SYSTEM FOR KEEPING A VEHICLE IN A LANE WHEN CROSSING AN INTERSECTION BY USING LOCAL MAP DATA RECEIVED FROM A TRANSMITTER LOCATED WITHIN A ZONE OF THE INTERSECTION

(71) Applicant: FEV Group GmbH, Aachen (DE)

(72) Inventors: Sherif Matta, Auburn Hills, MI (US); Qusay Alrousan, Auburn Hills, MI (US); Thomas Tasky, Auburn Hills, MI (US); Siddhartha Yedida, Auburn Hills, MI (US)

(73) Assignee: FEV Group GmbH, Aachen (DE)

( * ) Notice: Subject to any disclaimer, the term of this patent is extended or adjusted under 35 U.S.C. 154(b) by 159 days.

(21) Appl. No.: 18/224,761

(22) Filed: Jul. 21, 2023

(65) Prior Publication Data
US 2025/0026400 A1 Jan. 23, 2025

(51) Int. Cl.
*B62D 6/00* (2006.01)
(52) U.S. Cl.
CPC ..................... *B62D 6/001* (2013.01)
(58) Field of Classification Search
CPC .............................. B62D 6/001; B62D 15/025
USPC ........................................................ 701/41
See application file for complete search history.

(56) References Cited

U.S. PATENT DOCUMENTS

| 9,261,601 | B2 | 2/2016 | Ibrahim |
| 9,834,212 | B2 | 12/2017 | Park |
| 2016/0280134 | A1* | 9/2016 | Miura ....................... G08G 1/04 |
| 2022/0135022 | A1* | 5/2022 | Katsu ................. B62D 15/0285 |
| | | | 701/41 |
| 2022/0381579 | A1* | 12/2022 | White ................ G01C 21/3697 |
| 2023/0098420 | A1* | 3/2023 | Kuno .............. B60W 30/18159 |
| | | | 701/26 |
| 2024/0336299 | A1* | 10/2024 | Hamada ............ B60W 30/0956 |

* cited by examiner

*Primary Examiner* — Yi-Kai Wang
(74) *Attorney, Agent, or Firm* — Dinsmore & Shohl LLP

(57) ABSTRACT

The present disclosure relates to a driver-assistance system for keeping a vehicle in a lane of a road, the driver-assistance system including a sensor system, a receiver and a control system, wherein the receiver is designed to receive local map data from a transmitter located within a zone of an intersection, wherein the local map data specifies a course of the lane at least partially, wherein the control system is configured to calculate further data for specifying a course of a part of the lane dependent on the local map data, wherein the part of the lane leads at least partially across the intersection, wherein the control system is configured to control a steering system of the vehicle dependent on the further data and sensor data generated by means of the sensor system in order to keep the vehicle in the lane when crossing the intersection.

14 Claims, 5 Drawing Sheets

DRIVER-ASSISTANCE SYSTEM FOR KEEPING A VEHICLE IN A LANE WHEN CROSSING AN INTERSECTION BY USING LOCAL MAP DATA RECEIVED FROM A TRANSMITTER LOCATED WITHIN A ZONE OF THE INTERSECTION

TECHNICAL FIELD

The present specification relates in general to the field of automated and semi-automated control of a vehicle and, in particular, to a driver-assistance system for keeping a vehicle in a lane and a vehicle including the driver-assistance system and a method for keeping a vehicle in a lane by a driver-assistance system.

BACKGROUND

Driver-assistance systems for keeping a vehicle in a lane usually make use of markings of a side-line of the lane. For example, a camera may produce images of markings of a left side-line and a right side-line of the lane and send the images to a control unit. The control unit may be equipped to control a distance of the vehicle to the left side-line and the right side-line dependent on information given by the images of the markings. Such a lane keep assistance system may prevent that the vehicle leaves the lane without any intend of the driver. However, such a lane keep assistance system may only function if the side-line markings are provided. Hence, there is a desire to enhance a functionality of lane keep assistance systems to traffic situations where there are no markings of the side-lines of a current lane of the vehicle.

SUMMARY

Various embodiments provide a driver-assistance system for keeping a vehicle in a lane and a method for keeping a vehicle in a lane as described by the subject matter of the independent claims. Advantageous embodiments are described in the dependent claims. Embodiments of the present invention can be freely combined with each other if they are not mutually exclusive.

In one aspect, the present disclosure relates to a driver-assistance system for keeping a vehicle in a lane of a road. The driver-assistance system includes a sensor system, a receiver and a control system. The receiver is configured to receive local map data from a transmitter located within a zone of an intersection. The local map data specifies a course of the lane at least partially. The control system is configured to calculate further data for specifying a course of a part of the lane dependent on the local map data, wherein the part of the lane leads at least partially across the intersection. Furthermore, the control system is configured to control a steering system of the vehicle dependent on the further data and sensor data generated by the sensor system in order to keep the vehicle in the lane when crossing the intersection.

In another aspect, the present disclosure relates to a method for keeping a vehicle in a lane by a driver-assistance system, wherein the driver-assistance system includes a receiver and a control system. The method includes the following steps. In a first step, local map data is received by the receiver from a transmitter located within a zone of an intersection, wherein the local map data specifies a course of the lane at least partially. In a second step, further data for specifying a course of a part of the lane is calculated dependent on the local map data, wherein the part of the lane crosses the intersection. In a third step, a steering system of the vehicle is controlled dependent on the further data and sensor data generated by the sensor system in order to keep the vehicle in the lane when crossing the intersection.

In another aspect, the present disclosure relates to a vehicle including the above mentioned driver-assistance system.

The descriptions of the various embodiments of the present disclosure will be presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The above-mentioned part of the lane may be referred to as crossing lane part as this part of the lane leads at least partially across the intersection. As used herein, the term "lane" refers to a current lane of the road in which the vehicle drives when approaching the intersection. The road may cross at least one further road at the intersection. For further explanation, a zone where the lane crosses the intersection in a center of the intersection may be referred to as center zone of the intersection or as center zone in the following.

Generally, the lane may include markings for marking a left side-line of the lane, also referred to as left markings in the following, and markings for marking a right side-line of the lane, also referred to as right markings in the following, in a distance from the center zone. The left markings may be designed in the form of a left dashed line or a left solid line. Similarly, the right markings may be designed in the form of a right dashed line or a right solid line. A first part of the lane that includes the left markings and the right markings and is located in a distance from the center zone in the opposite direction of travel may be referred to as initial intersection part of the lane or abbreviated as initial lane part in the following. The left and right markings of the initial lane part may be referred to as left initial markings and right initial markings respectively in the following.

Analogously, a second part of the lane that includes the left markings and the right markings and is located in a distance from the center zone in the direction of travel may be referred to as final intersection part of the lane or abbreviated as final lane part in the following. The left and right markings of the final lane part may be referred to as left final markings and right final markings respectively in the following.

The left and right initial markings as well as the right and left final markings may be detectable by a driver of the vehicle or by a further sensor system of the vehicle. In one example, the further sensor system may include a camera system and an image recognition system and/or a lidar system.

In the context of this disclosure, it is assumed that beside the initial lane part and the final lane part, the lane may include an intermediate part that is located between the initial lane part and the final lane part, which is referred to as intermediate lane part in the following. The intermediate lane part may not include the left markings and/or the right markings in one example. In this case, the intermediate lane part is neither visible for the driver nor detectable by the further sensor system. In another example, the intermediate lane part may include the left markings and/or the right markings, but these markings may be damaged, faded or interrupted or occluded by further vehicles such that a recognition or detection of these markings by the driver or by the further sensor system may be faulty. The left markings of the intermediate lane part may be referred to as left intermediate markings in the following. Analogously, the right markings of the intermediate lane part may be referred to as right intermediate markings in the following.

The intermediate lane part may cross the intersection at least partially, in some instances completely. For example, in case the initial lane part and/or the final lane part extends a bit into the intersection, then the intermediate lane part may cross the intersection only partially. In case the initial lane part and the final lane part do not extend into the intersection, then the intermediate lane part may cross the intersection completely in one example.

Although the intermediate lane part may be hardly visible for the driver and hardly detectable by means of the camera system, the driver or the driver-assistance system is supposed to steer the vehicle such that the vehicle stays in the intermediate lane part of the lane when crossing the intersection in order to avoid frontal collisions.

Since the control system is configured to calculate the further data specifying the course of the crossing lane part and configured to control the steering system of the vehicle dependent on the further data and the sensor data in order to keep the vehicle in the lane, and thus in the crossing lane part, when crossing the intersection, the frontal collisions may be avoided. This may enhance the desirability of the driver-assistance system, especially in bad weather conditions, such as snow, ice or glare, in dense traffic on the intersection or in case there are no intermediate markings.

In one example, the crossing lane part may form a part of the intermediate lane part. In this example, the further data may specify only a part of the left and/or right intermediate markings. Conveniently, the crossing lane part may form the complete intermediate lane part. Consequently, the vehicle may be steered over the complete intersection without incident by the control system using the further data specifying the complete course of the intermediate lane part. The further data may specify a course of the left and/or right intermediate markings completely.

In embodiments, the driver-assistance systems may steer the vehicle autonomously to keep the vehicle in the intermediate lane when crossing the intersection. However, in one example, controlling the steering system may involve performing corrections of motions of the steering system, for example a motion of a steering wheel, provoked by the driver. In this case, the driver-assistance systems may steer the vehicle in a semi-automated manner.

The local map data may include coordinates, such as GPS coordinates, of one, two or more points that are located on the initial lane part, also referred to as initial lane part points. Alternatively or in addition, the local map data may include coordinates, such as GPS coordinates, of one, two or more points that are located on the final lane part, also referred to as final lane part points. Alternatively or in addition, the further data may include coordinates, such as GPS coordinates, of points that are located on the crossing lane part, also referred to as crossing lane part points.

The local map data may specify the course of the lane at least partially by specifying a course of the initial lane part at least partially in one example. For example, a single initial lane part point may indicate a position, such as a global position, of the initial lane part. Two initial lane part points may together prescribe a direction of the initial lane part. Three initial lane part points may together specify a curvature of the initial lane part. Alternatively or in addition, the local map data may specify the course of the lane at least partially by specifying a course of the final lane part at least partially. For example, a single final lane part point may indicate a position, such as a global position, of the final lane part. Two final lane part points may together prescribe a direction of the final lane part. Three final lane part points may together specify a curvature of the final lane part.

Analogously, the further data may specify the course of the crossing lane part by one, two or more crossing lane part points. For example, the further data may indicate a position, such as a global position, of the crossing lane part by one crossing lane part point, a direction of the crossing lane part by two crossing lane part points and/or a curvature of the crossing lane part by three crossing lane part points.

BRIEF DESCRIPTION OF THE SEVERAL VIEWS OF THE DRAWINGS

In the following, embodiments of the present disclosure are explained in greater detail, by way of example only, making reference to the drawings in which.

DETAILED DESCRIPTION

Figure 1:
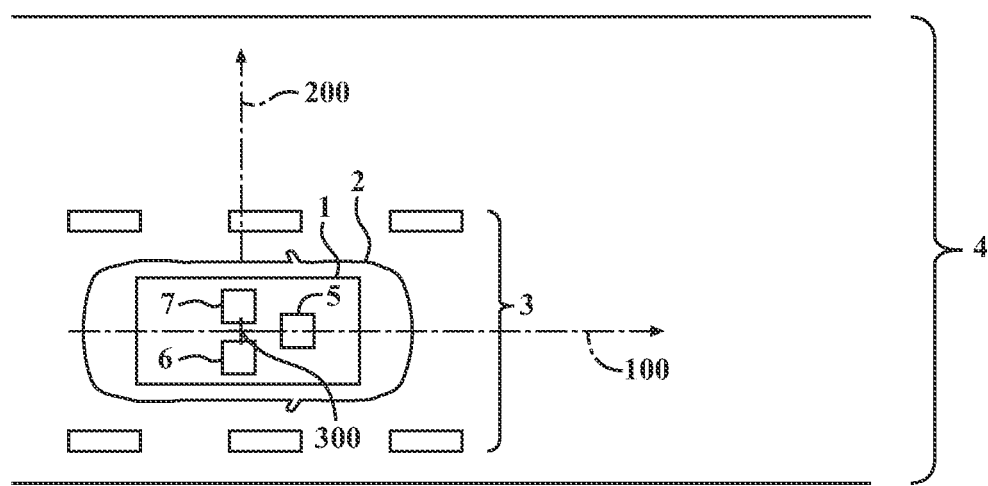
FIG. 1 depicts a vehicle including a driver-assistance system.

FIG. 1 depicts a driver-assistance system 1 for keeping a vehicle 2 in a lane 3 of a road 4. The driver-assistance system 1 includes a sensor system 5, a receiver 6 and a control system 7.

The driver-assistance system 1 may include an electronic control unit (ECU), a central processing unit (CPU), and/or the like, for preforming the functions as described herein.

For example, the ECU may be configured to receive, analyze and process sensor data, perform calculations and mathematical functions, convert data, control steering system components, and the like. The ECU may include one or more processors, and other components, for example one or more memory modules that stores logic that is executable by the one or more processors. Each of the one or more processors may be a controller, an integrated circuit, a microchip, central processing unit or any other computing device. The one or more memory modules may be non-transitory computer readable medium and may be configured a RAM, ROM, flash memories, hard drives, and, or any device capable of storing computer-executable instructions, such that the computer-executable instructions can be accessed by the one or more processors. The computer-executable instructions may include logic or algorithms, written in any programming language of any generation such as, for example machine language that may be directly executed by the processors, or assembly language, object orientated programming, scripting languages, microcode, etc., that may be compiled or assembled into computer-executable instructions and storage on the one or more memory modules. Alternatively, the computer-executable instructions may be written in our hardware description language, such as logic implemented via either a field programmable gate array (FPGA) configuration or an application specific integrated circuit (ASIC), all their equivalents. Accordingly, the methods and/or processes described herein may be implemented in any conventional computer programming language, as preprogrammed hardware elements, or as a combination of hardware and software components.

In addition, in some aspects, a computer program product may include a medium, such as the non-transitory, processor-readable storage medium, for performing the functions as described herein. For example, the computer program product may be configured to receive, analyze and process sensor data, perform calculations and mathematical functions, convert data, control steering system components, and the like.

Figure 2:
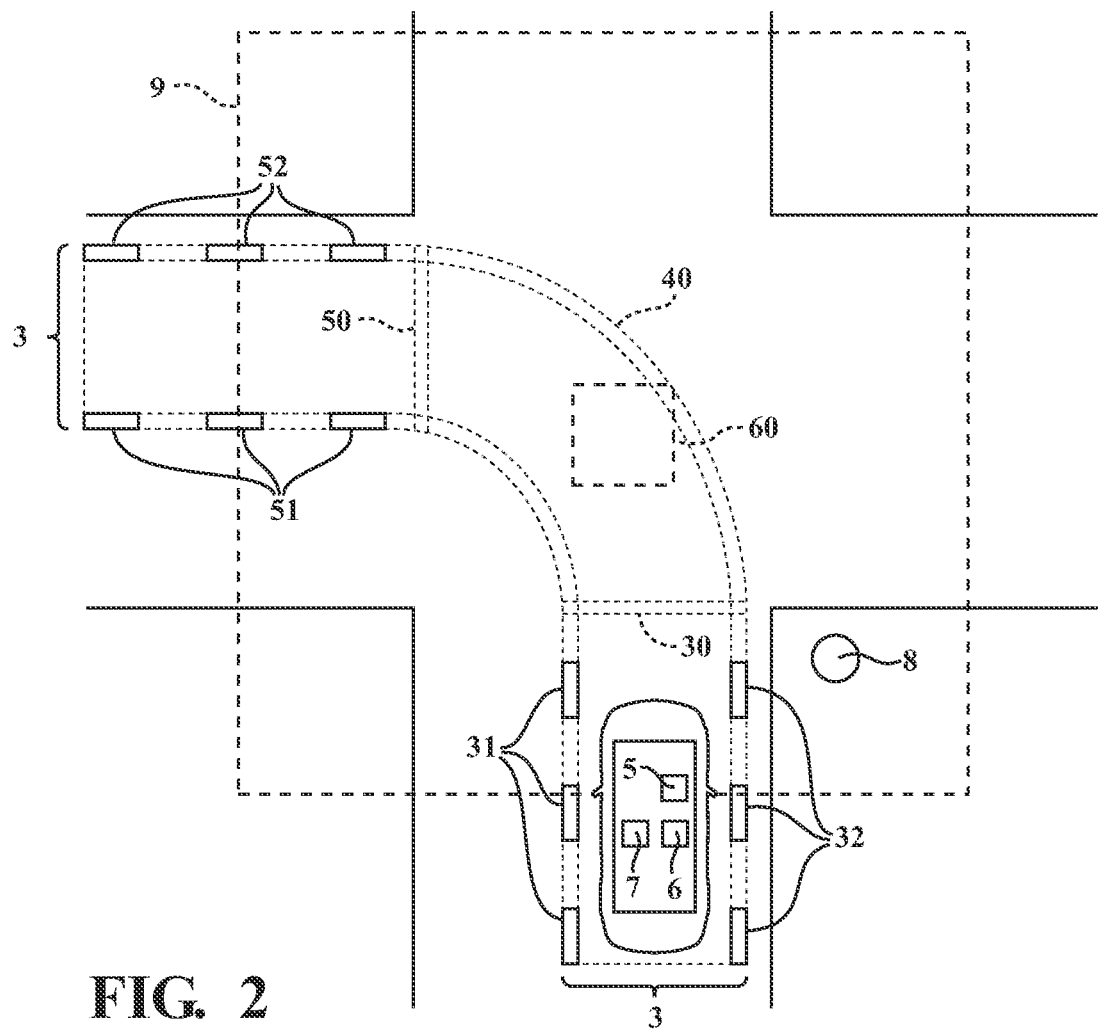
FIG. 2 illustrates the vehicle shown in FIG. 1 located in a zone of an intersection.

FIG. 2 shows the vehicle 2 with the driver-assistance system 1 in a traffic situation in which the vehicle 2 approaches a zone of an intersection 9. In the following, it is assumed that the vehicle 2 is supposed to turn left at the intersection 9. In order to realize a safe turn to the left, the vehicle 2 is supposed to stay in the lane 3 as depicted in FIG. 2. The lane 3 may include an initial lane part 30 that is located in a distance to a central zone 60 of the intersection 9 in the opposite direction of travel of the vehicle 2. Boundaries of the initial lane part 30 may be indicated by dashed lines in FIG. 2. The lane 3 may further include a final lane part 50 that is located in a distance from the central zone 60 in the direction of travel of the vehicle 2. Boundaries of the final lane part 50 may be indicated by dashed lines in FIG. 2. The initial lane part 30 may include left initial markings 31 for indicating a left sideline of the initial lane part 30 and right initial markings 32 for indicating a right sideline of the initial lane part 30.

Analogously, the final lane part 50 may include left final markings 51 for indicating a left sideline of the final lane part 50 and right final markings 52 for indicating a right sideline of the final lane part 50. Furthermore, the lane 3 may include an intermediate lane part 40 which is located between the initial lane part 30 and the final lane part 50 as can be seen in FIG. 2. The intermediate lane part 40 may not include markings for indicating boundaries of the intermediate lane part 40 according to the example shown in FIG. 2. Furthermore, FIG. 2 indicates that the intermediate lane part 40 leads at least partially across the intersection 9. According to the example shown in FIG. 2, the above mentioned crossing lane part may form the complete intermediate lane part 40.

The receiver 6 may be configured to receive local map data from a transmitter 8 located within the zone of the intersection 9. The local map data may specify a course of the lane 3, at least partially. The control system 7 may be configured to calculate further data for specifying a course of the crossing lane part, here the intermediate lane part 40, dependent on the local map data. The control system 7 may be configured to control a steering system 850 of the vehicle 2, shown in FIG. 10, dependent on the further data and sensor data generated by means of the sensor system 5 in order to keep the vehicle 2 in the lane 3 when crossing the intersection 9.

Figure 3:
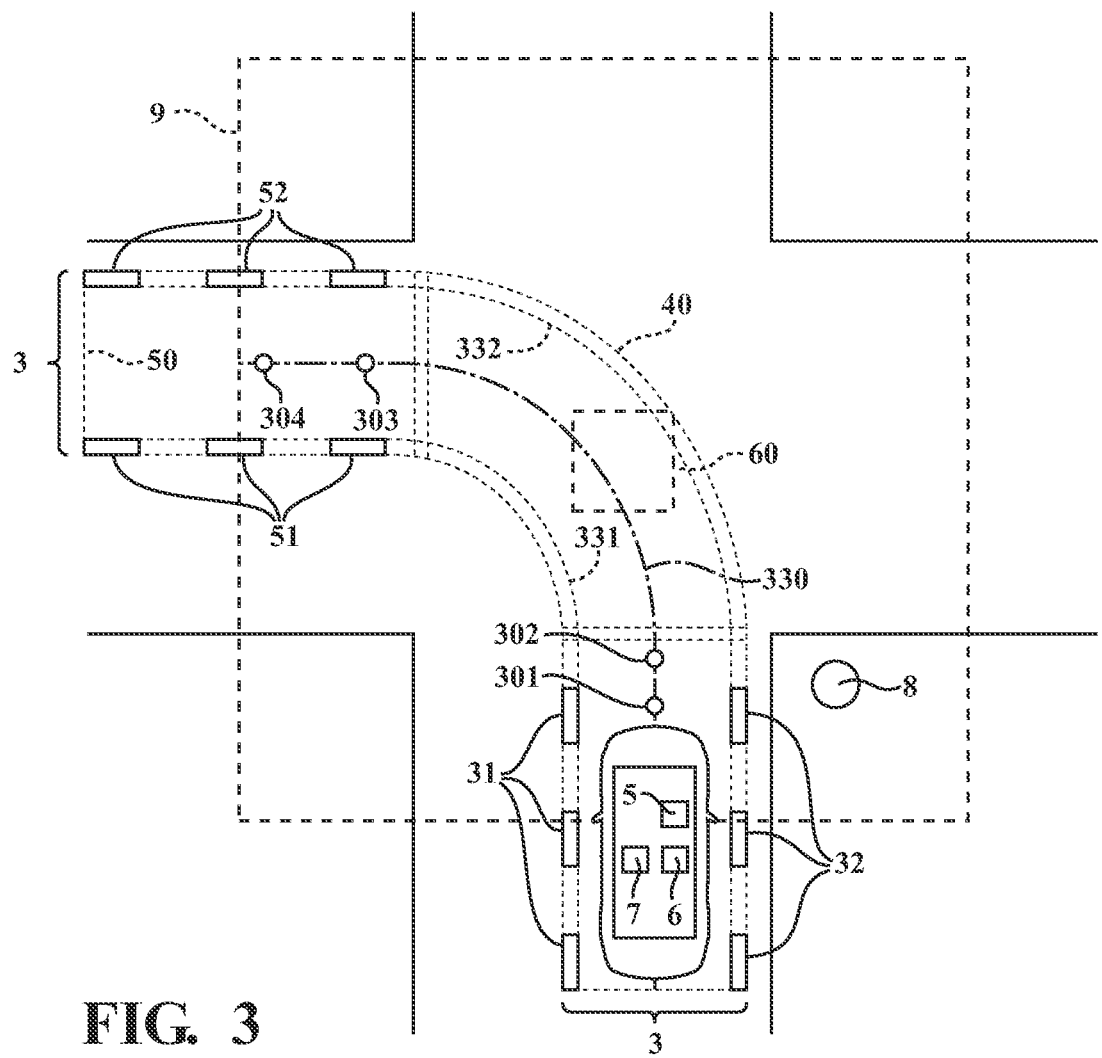
FIG. 3 demonstrates an application of the driver-assistance system shown in FIG. 1 according to which a receiver of the driver-assistance system receives local map data describing a course of an initial lane part and of a final lane part of a lane for crossing the intersection shown in FIG. 1.

FIG. 3 depicts an embodiment according to which the local map data includes GPS coordinates of points specifying a course of the initial lane part 30 and a course of the final lane part 50. The points specifying the course of the initial lane part 30 may include a first point 301 and the second point 302, as shown in FIG. 3. The points specifying the course of the final lane part 50 may include third point 303, and fourth point 304 as depicted in FIG. 3. The transmitter 8 may send a first message 400 including a respective set of GPS coordinates of each point describing the course of the lane 3, particularly the course of the initial lane part 30 and the course of the final lane part 50. The respective set of GPS coordinates may each include a respective value of latitude and a respective value of longitude in one example. Thus, the first message 400 may include a first value 411, a second value 421, a third value 431 and a fourth value 441 specifying a respective longitude value of the first point 301, the second point 302, the third point 303 and the fourth point 304 respectively. Analogously, the first message 400 may include a first value 412, a second value 422, third value 432 and fourth value 442 specifying a respective latitude value of the first point 301, the second point 302, the third point 303 and the fourth point 304 respectively.

In embodiments, the sensor system 5 may include a GPS sensor (e.g., a GPS sensor system). In this case, the sensor data may include global coordinates of the GPS sensor. The global coordinates of the GPS sensor may specify a current position of the vehicle 2 in a global coordinate system (e.g., GPS-data). Generally, the global coordinate system may specify points in the global coordinate system by means of a respective set of global coordinates including a respective value of the latitude and a respective value of the longitude.

The control system 7 may include an electronic control unit (ECU) for performing the functions as described herein. For example, the ECU may be configured to process the sensor data, calculate coefficients and perform mathematical functions, convert data such as GPS coordinates, control steering system components, and the like. The ECU may include one or more processors, and other components, for example one or more memory modules that stores logic that is executable by the one or more processors. Each of the one or more processors may be a controller, an integrated circuit, a microchip, central processing unit or any other computing device. The one or more memory modules may be non-transitory computer readable medium and may be configured a RAM, ROM, flash memories, hard drives, and, or any device capable of storing computer-executable instructions, such that the computer-executable instructions can be accessed by the one or more processors. The computer-executable instructions may include logic or algorithms, written in any programming language of any generation such as, for example machine language that may be directly executed by the processors, or assembly language, object orientated programming, scripting languages, microcode, etc., that may be compiled or assembled into computer-executable instructions and storage on the one or more memory modules. Alternatively, the computer-executable instructions may be written in our hardware description language, such as logic implemented via either a field programmable gate array (FPGA) configuration or an application specific integrated circuit (ASIC), all their equivalents. Accordingly, the methods and/or processes described herein may be implemented in any conventional computer programming language, as preprogrammed hardware elements, as a computer program product, or as a combination of hardware and software components.

The control system 7 may be configured to convert the GPS coordinates of the respective point describing the course of the lane 3 into local coordinates of a local coordinate system of the vehicle 2 dependent on the global coordinates of the GPS sensor. The local coordinate system may include a longitudinal axis 100 of the vehicle 2 as an x-axis and a y-axis 200 which is orientated perpendicular to the longitudinal axis 100, as depicted in FIG. 1. An orientation of the longitudinal axis 100 in the global coordinate system may be calculated taking into account a heading of the vehicle 2 measured by the GPS sensor. The orientation of the longitudinal axis 100 may be parallel to the heading of the vehicle 2.

In one example, an origin 300 of the local coordinate system may be in the center of inertia of the vehicle 2, as shown in FIG. 1. As such, the GPS sensor may be located in the origin 300. In this case, a conversion of the GPS coordinates of the respective point describing the course of the lane 3 into local coordinates of the local coordinate system may be realized by subtracting the latitude of the global coordinates of the GPS sensor from the latitude value of the GPS coordinates of the respective point and by subtracting the longitude of the global coordinates of the GPS sensor from the longitude value of the GPS coordinates of the respective point.

According to one embodiment, the further data may specify a course of at least one lateral lane boundary of the intermediate lane part 40, for example, a left lateral boundary 331 of the intermediate lane part 40. In one example, the further data may include values of coefficients of one or more mathematical functions for specifying the course of the crossing lane part, here the intermediate lane part 40. For example, the further data may include a first set of coefficients of a first mathematical function for specifying the course of the left lateral boundary 331. The first mathematical function may describe the course of the left lateral boundary 331 in the local coordinate system.

Analogously, the further data may include a second set of coefficients of a second mathematical function for specifying a course of a right lateral boundary 332 of the intermediate lane part 40. The second mathematical function may describe the course of the right lateral boundary 332 in the local coordinate system of the vehicle 2. The control system 7 may calculate the first set of coefficients and the second set of coefficients such that the first mathematical function and the second mathematical function may run parallel to a center line 330 of the lane 3 including the first point 301, the second point 302, the third point 303 and the fourth point 304. The center line 300 may be calculated by a regression method on the basis of the local coordinates of the first point 301, the second point 302, the third point 303 and the fourth point 304. A sum of a distance between the left lateral boundary 331 and the center line 330 and a distance between the right lateral boundary 332 and the center line 300 may be equal to a width of the lane 3.

The driver-assistance system 1 may include a lateral controller 800 for controlling a lateral distance between the vehicle 2, such as the origin 300 of the local coordinate system, and the lateral lane boundary of the intermediate lane part 40, for example the left lateral boundary 331 and/or the right lateral boundary 332, in order to keep the vehicle 2 in the lane 3 when crossing the intersection 9.

That is, the lateral controller 800 may be an electronic control unit (ECU), central processing unit (CPU), and the like, that includes one or more processors, and other components, for example one or more memory modules that stores logic that is executable by the one or more processors, configured to perform the functionality as described herein. For example, the functionality of controlling a lateral distance between the vehicle 2, such as the origin 300 of the local coordinate system, and the lateral lane boundary of the intermediate lane part 40, for example the left lateral boundary 331 and/or the right lateral boundary 332, in order to keep the vehicle 2 in the lane 3 when crossing the intersection 9, control steering system or components thereof, and the like. Further, each of the one or more processors may be a controller, an integrated circuit, a microchip, central processing unit or any other computing device. The one or more memory modules may be non-transitory computer readable medium and may be configured a RAM, ROM, flash memories, hard drives, and, or any device capable of storing computer-executable instructions, such that the computer-executable instructions can be accessed by the one or more processors.

The control system 7 may be configured to control the steering system 850 of the vehicle 2, such as by using the lateral controller 800, dependent on the current position of the vehicle 2 and dependent on the course of the crossing lane part, here the intermediate lane part 40, in order to keep the vehicle 2 in the lane 3 when crossing the intersection 9.

Figure 5:
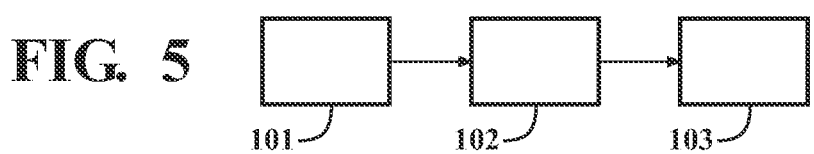
FIG. 5 is a flowchart of a method for keeping the vehicle shown in FIG. 1 in a lane by means of the driver-assistance system shown in FIG. 1.

FIG. 5 depicts steps of a method for keeping the vehicle 2 in the lane 3 by the driver-assistance system 1. In a first step 101, the local map data may be received by the receiver 6 from the transmitter 8. In one example, the transmitter 8 may send out the first message 400 or a second message 600. The receiver 6 may receive the first message 400 or the second message 600 from the transmitter 8 respectively. In either case, the first message 400 or the second message 600 may include the local map data specifying the course of the lane 3, at least partially.

In a second step 102, the further data for specifying the course of the crossing lane part may be calculated dependent on the local map data. For example, the control system 7 may use the first and/or second mathematical function for generating the further data.

In a third step 103, the steering system 850 of the vehicle 2 may be controlled by the control system 7 dependent on the further data and the sensor data generated by the sensor system 5 in order to keep the vehicle 2 in the lane when crossing the intersection 9.

Figure 6:
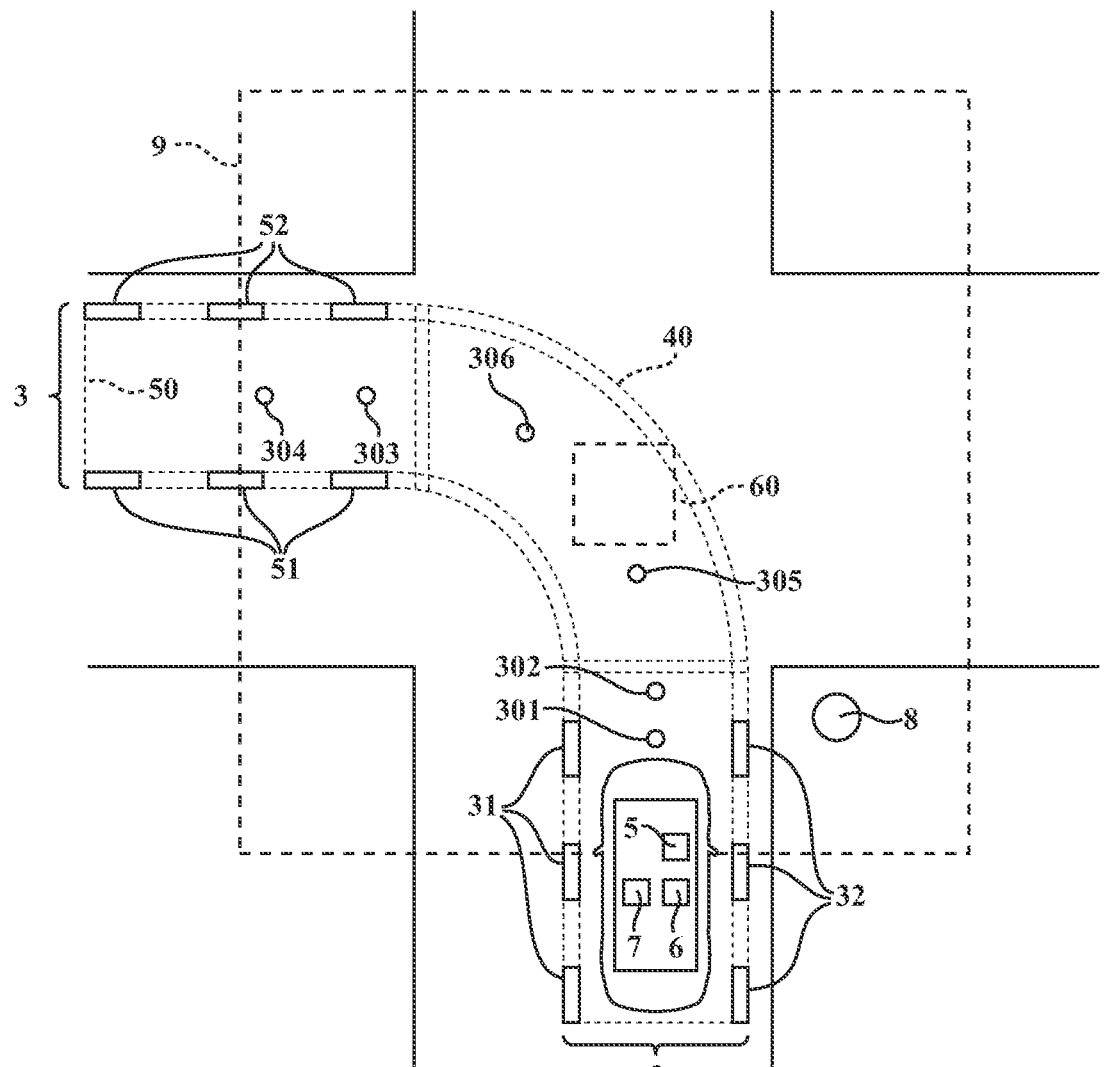
FIG. 6 depicts an application of the driver-assistance system shown in FIG. 1 according to which a receiver of the driver-assistance system receives local map data describing a course of an initial lane part, of a final lane part and of an intermediate part of a lane for crossing the intersection shown in FIG. 1.

FIG. 6 depicts a further example, according to which the local map data may specify the course of the lane 3, at least partially, by partially specifying the course of the initial lane part 30, the course of the final lane part 50 and the course of the intermediate lane part 40. In this example, the local map data may include the GPS coordinates of the first point 301, the second point 302, the third point 303 and the fourth point 304, similarly to the example shown in FIG. 3, and, in addition, GPS coordinates of points specifying the course of the intermediate lane part 40. The points specifying the course of the intermediate lane part 40 may include a fifth point 305 and a sixth point 306, as shown in FIG. 6.

According to the example shown in FIG. 6, the transmitter 8 may send the second message 600 including a respective set of GPS coordinates of the first point 301, the second point 302, the third point 303, the fourth point 304, the fifth point 305 and the sixth point 306.

Figure 4:
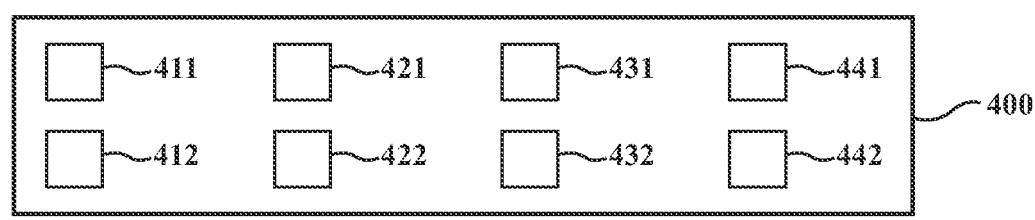
FIG. 4 displays local map data of a first message sent out by a transmitter located within the zone of the intersection shown in FIG. 3.
Figure 7:
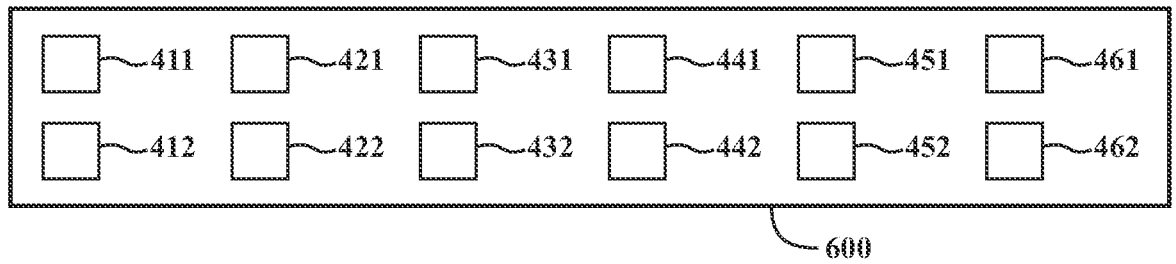
FIG. 7 displays local map data of a second message sent out by the transmitter located within the zone of the intersection shown in FIG. 6.

Thus, in addition to the values of the first message 400 depicted in FIG. 4, the second message 600 may include a fifth value 451 and a sixth value 461 of the longitude for specifying the longitude value of the fifth point 305 and the sixth point 306 respectively, as shown in FIG. 7. Analogously, the second message 600 may include a fifth value 452 and a sixth value 462 of the latitude for specifying the latitude value of the fifth point 305 and the sixth point 306 respectively. In the example according to FIG. 7, the control system 7 may determine the center line 330 on the basis of the GPS coordinates of the first point 301, the second point 302, the third point 303, the fourth point 304, the fifth point 305 and the sixth point 306.

Figure 8:
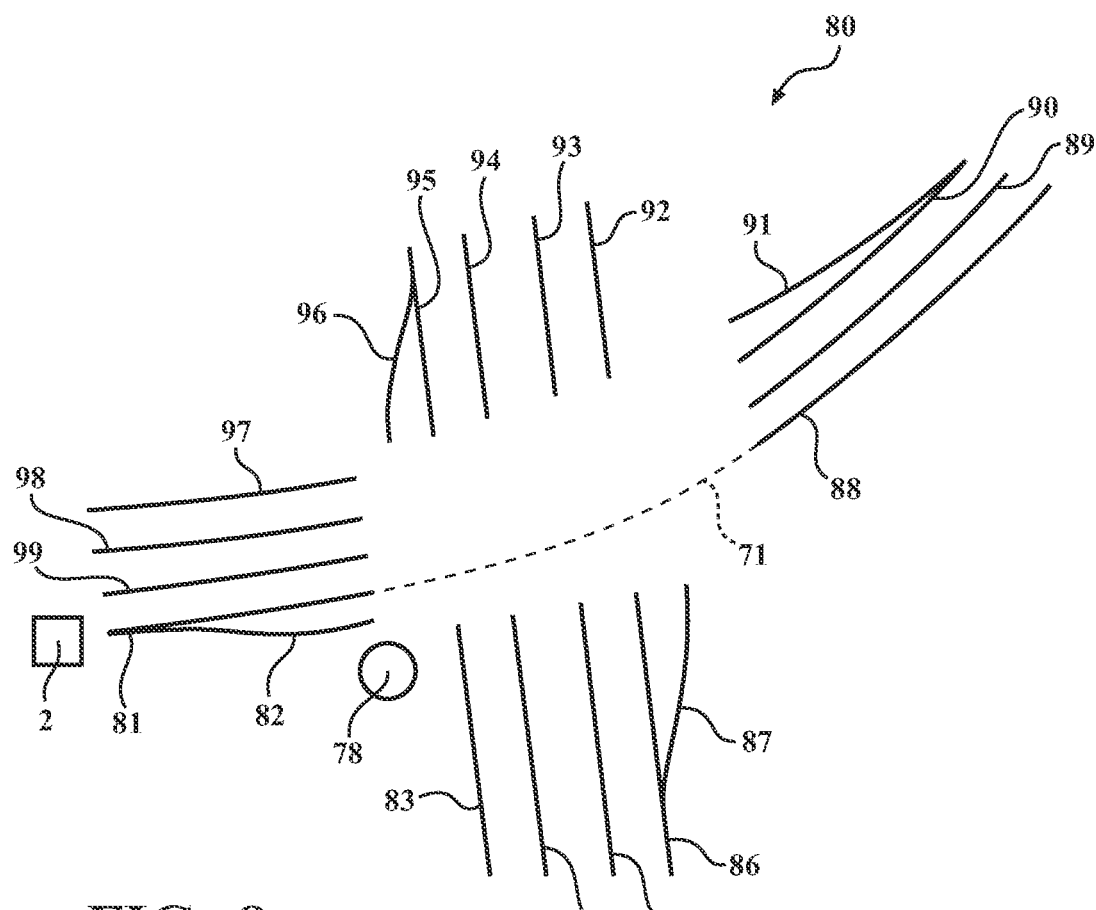
FIG. 8 illustrates the vehicle shown in FIG. 1 at a further intersection with several incoming lanes and several outgoing lanes.
Figure 9:
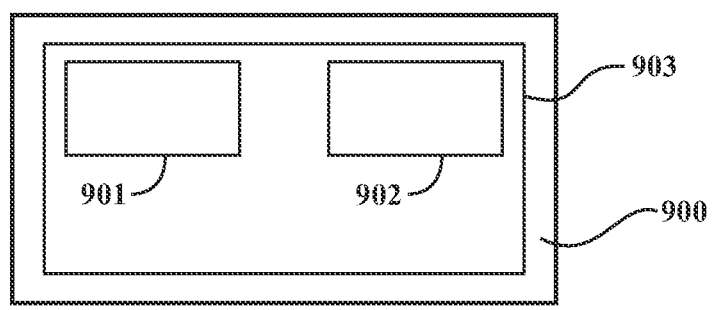
FIG. 9 displays local map data of a third message sent out by a further transmitter located within a zone of the further intersection shown in FIG. 8.

FIG. 8 illustrates a further intersection 80. Several lanes lead to the intersection 80, such as a first lane 81, a second lane 82, a fifth lane 85, a sixth lane 86, a seventh lane 87, a tenth lane 90, an eleventh lane 91, a fourteenth lane 94, a fifteenth lane 95, a sixteenth lane 96 and a nineteenth lane 99, in the following also referred to as incoming lanes. Further lanes lead away from the intersection 80, such as a third lane 83, a fourth lane 84, an eighth lane 88, a ninth lane 89, a twelfth lane 92, a thirteenth lane 93, a seventeenth lane 97 and an eighteenth lane 98, in the following also referred to as outgoing lanes. A further transmitter 78 may send out repeatedly a third message 900 including further local map data 903. The further local map data 903 may include geographic data 901 including GPS coordinates of further points specifying a respective course of a respective one of the incoming lanes and a respective course of a respective one of the outgoing lanes and assignment data 902. The assignment data 902 may indicate which of the incoming lanes lead to which of the outgoing lanes.

For example, the assignment data 902 may indicate that the first lane 81 and the seventh lane 87 lead to the eighth lane 88, that the second lane 82 and the fifteenth lane 95 lead to the third lane 83, that the fourteenth lane 94 leads to the fourth lane 84, that the fifth lane 85 leads to the thirteenth lane 93, that the sixth lane 86 leads to the twelfth lane 92, that the tenth lane 90 leads to the eighteenth lane 98, that the sixteenth lane 96 leads to the seventeenth lane 97 and that the nineteenth lane 99 leads to the ninth lane 89.

The control system 7 may be configured to compute a course of a respective connecting lane between a respective pair of one of the incoming lanes a corresponding one of the outgoing lanes. For example, the control system 7 may calculate a course of a first connecting lane 71 which connects the first lane 81 with the eighth lane 88 on the bases of the further local map data 903. The control system 7 may apply an approximation method to compute the course of the first connecting lane 71, similarly to a method for computing the center line 330 of the intermediate lane part 40. The course of the first connecting lane 71 may be prescribed by a further mathematical function. For example, a course of a left sideline of the first connecting lane 71 may be described by a third mathematical function and a course of a right sideline of the first connecting lane 71 may be described by a fourth mathematical function. Furthermore, the control system 7 may be configured to steer the vehicle 2 across the further intersection 80 along the first connecting lane 71 dependent on the sensor data generated by means of the GPS sensor and computed boundaries of the first connecting lane 71. The control system 7 may control the steering system 850 of the vehicle 2 such that the vehicle 2 stays in the middle of the first connecting lane 71 when crossing the further intersection 80. To realize this, the control system 7 may control the steering system 850 such that a distance between a left sideline of the first connecting lane 71 and the vehicle 2 a distance between a right sideline of the first connecting lane 71 and the vehicle 2 is approximately equal.

In one example, the first, second, third and/or fourth mathematical function may be a polynomial. This may have the advantage that the mathematical function can be derived in a fast manner, for example by applying the regression method. Generally, the first, second, third and/or fourth mathematical function may also involve concatenated functions. These concatenated functions may, for example, represent an artificial neural network.

According to one example, the first, second, third and/or fourth mathematical function may be a respective 4-degree polynomial. In this case, a position, a heading, a curvature and a change in the curvature of the left sideline 331, the right sideline 332, the left sideline of the first connecting lane 71 and/or the right sideline of the first connecting lane 71 may be represented by the first, second, third and/or fourth mathematical function respectively. In the following it is assumed that a first 4-degree polynomial may represent the course of the left sideline 331. A first coefficient of the first 4-degree polynomial may prescribe a position of the sideline 331 within the local coordinate system. A second coefficient of the first 4-degree polynomial may describe a heading of the sideline 331 within the local coordinate system. A third coefficient of the first 4-degree polynomial may specify a curvature of the sideline 331. A fourth coefficient of the first 4-degree polynomial may indicate a change of the curvature of the sideline 331.

The lateral controller 800 may be configured to control the steering system 850 of the vehicle 2 on the basis of the coefficients of the first, second, third and/or fourth mathematical function in case these functions are designed in the of the 4-degree polynomials.

Figure 10:
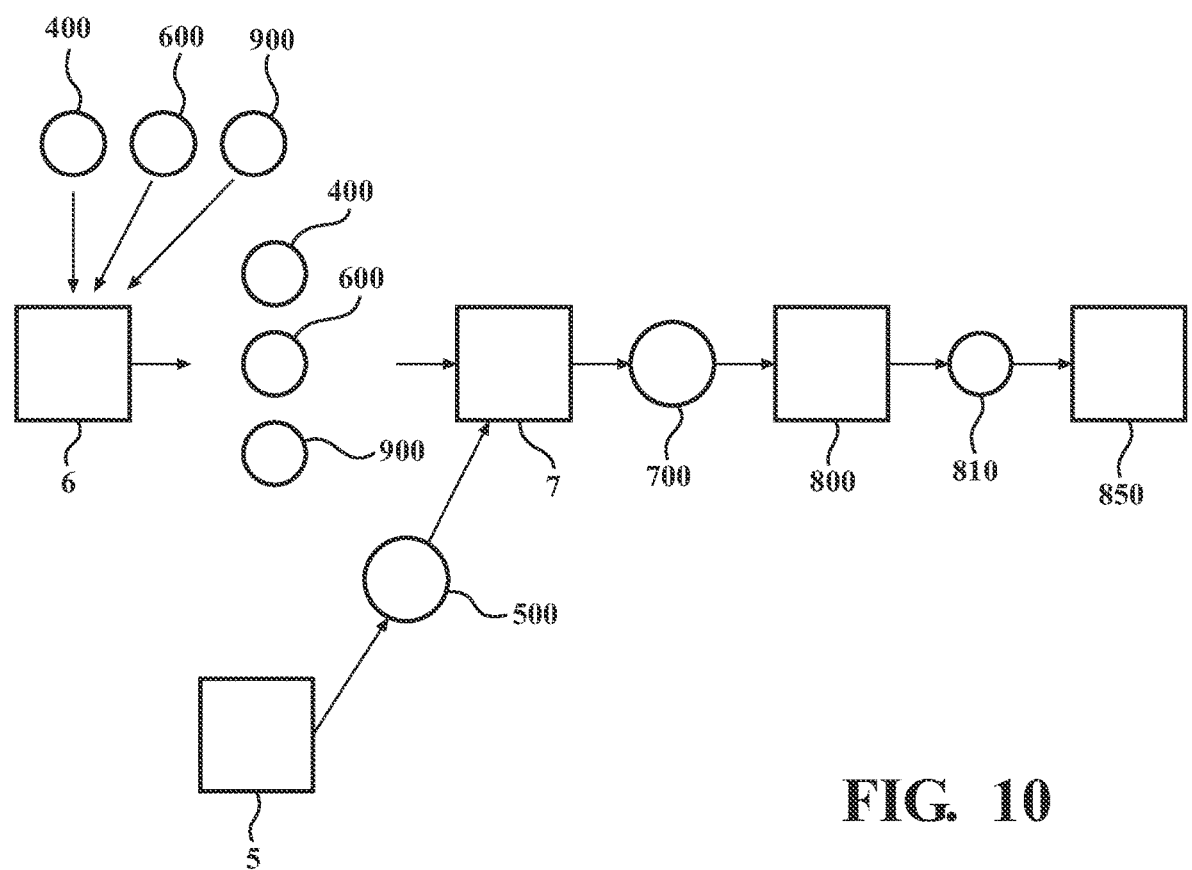
FIG. 10 is a flowchart showing a dataflow for controlling a steering system of the vehicle shown in FIG. 1 dependent on the local map data either of the first message shown in FIG. 4, the second message depicted in FIG. 7 or of the third message shown in FIG. 9.

FIG. 10 depicts a flowchart showing a dataflow when controlling the vehicle 2 dependent on the local map data. The receiver may either receive the first message 400 or the second message 600 in a first case in which the vehicle 2 approaches the intersection 9 or the third message 900 in a second case in which the vehicle 2 approaches the further intersection 80. It is understood that the vehicle 2 may be located within a communicable range of the transmitter 8 for receiving the first message 400 or the second message 600 in the first case and within a communicable range of the further transmitter 78 in the second case.

Generally, the receiver 6 may forward all incoming messages, such as the first message 400, the second message 600 or the third message 900 to the control system 7, as shown in FIG. 10. The incoming messages may also involve further messages from several intersections located within a reception zone of the receiver 6. The control system 7 may filter the first message 400, the second message 600 or the third message 900 each as a message of the closest intersection dependent on the current position of the vehicle 2 detected by means of the GPS sensor. The control system 7 may receive the incoming messages via an Ethernet connection between the receiver 6 and the control system 7. In order to reduce the amount of the incoming messages, the receiver 6 may be designed to receive the local map data using a short-range communication standard. The short-range communication standard may be the dedicated short range communication (DSRC) standard. In the last case, the receiver 6 may only receive the local map data from a receiver which is associated to the closest intersection with respect to the receiver 6.

In the following it is assumed that the first, second, third and/or fourth mathematical function may be designed in the form of a respective 4-degree polynomial. In this case, the control system 7 may calculate the four coefficients of the first mathematical function specifying the left sideline 331 and the four coefficients of the second mathematical function specifying the right sideline 332, for example by applying the regression method. These coefficients may be referred to as ego lane coefficients 700 in the following. The control system 7 may send the ego lane coefficients 700 to the lateral controller 800.

The lateral controller 800 may control a steering angle of the steering system 850 via steering commands 810 to keep the vehicle 2 within the lane 3 when crossing the intersection 9.

The ego lane coefficients 700 may be updated each time the GPS sensor receives a new GPS signal and sends an updated set 500 of GPS coordinates to the control system 7. In response to receiving an updated version of the ego lane coefficients 700, the lateral controller 800 may recalculate the steering commands 810 and send the updated steering commands 810 to the steering system 850.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A driver-assistance system for keeping a vehicle in a lane of a road, the driver-assistance
   system comprising:
   a sensor system;
   a receiver configured to receive local map data from a transmitter located within a zone of an intersection, the local map data specifies a course of the lane at least partially; and
   a control system configured to:
   calculate further data for specifying a course of a part of the lane dependent on the local map data, the part of the lane leads at least partially across the intersection, and
   control a steering system of the vehicle dependent on the further data and sensor data generated by the sensor system in order to keep the vehicle in the lane when crossing the intersection.

2. The driver-assistance system according to claim 1, wherein the further data specifies a course of at least one lateral lane boundary of the part of the lane and the driver-assistance system comprises a lateral controller for controlling a lateral distance between the vehicle and the lateral lane boundary in order to keep the vehicle in the lane when crossing the intersection.

3. The driver-assistance system according to claim 1, wherein:
   the sensor system is configured as a GPS-sensor system;
   the sensor data has GPS-data for specifying a current position of the vehicle in a coordinate system; and
   the control system is configured to control the steering system of the vehicle dependent on the current position and dependent on the course of the part of the lane,
   wherein the course of the part of the lane is specified in the coordinate system by the further data.

4. The driver-assistance system according to claim 1, wherein the further data comprises values of coefficients of a mathematical function for specifying the course of the part of the lane.

5. The driver-assistance system according to claim 4, wherein the mathematical function is a polynomial.

6. The driver-assistance system according to claim 5, wherein the mathematical function is a 4-degree polynomial.

7. The driver-assistance system according to claim 1, wherein the receiver is configured to receive the local map data using a short-range communication standard.

8. A method for keeping a vehicle in a lane by a driver-assistance system, the driver-assistance system has a receiver and a control system, the method comprising the following steps:
   receiving local map data by means of the receiver from a transmitter located within a zone of an intersection, wherein the local map data specifies a course of the lane at least partially;
   calculating further data for specifying a course of a part of the lane dependent on the local map data, wherein the part of the lane crosses the intersection; and
   controlling a steering system of the vehicle dependent on the further data and sensor data generated by means of the sensor system in order to keep the vehicle in the lane when crossing the intersection.

9. A computer program product having instructions, wherein an executing of the instructions by one or more processors initiates the one or more processors to execute:
   receiving local map data by means of the receiver from a transmitter located within a zone of an intersection, wherein the local map data specifies a course of the lane at least partially;
   calculating further data for specifying a course of a part of the lane dependent on the local map data, wherein the part of the lane crosses the intersection; and
   controlling a steering system of the vehicle dependent on the further data and sensor data generated by means of the sensor system in order to keep the vehicle in the lane when crossing the intersection.

10. A vehicle comprising:
    a driver-assistance system for keeping the vehicle in a lane of a road, the driver-assistance system having:
    a sensor system,
    a receiver configured to receive local map data from a transmitter located within a zone of an intersection, wherein the local map data specifies a course of the lane at least partially, and
    a control system configured to:
    calculate further data for specifying a course of a part of the lane dependent on the local map data, wherein the part of the lane leads at least partially across the intersection, and
    control a steering system of the vehicle dependent on the further data and sensor data generated by the sensor system in order to keep the vehicle in the lane when crossing the intersection.

11. The driver-assistance system according to claim 1, wherein the local map data specifies the course of the lane at least partially to control the vehicle for travel along the course.

12. The method according to claim 8, wherein the local map data specifies the course of the lane at least partially to control the vehicle for travel along the course.

13. The computer program product according to claim 9, wherein the local map data specifies the course of the lane at least partially to control the vehicle for travel along the course.

14. The vehicle according to claim 10, wherein the local map data specifies the course of the lane at least partially to control the vehicle for travel along the course.

* * * * *